United States Patent
Devos et al.

(10) Patent No.: US 7,296,990 B2
(45) Date of Patent: Nov. 20, 2007

(54) SYSTEMS AND METHODS OF SOLID FREEFORM FABRICATION WITH TRANSLATING POWDER BINS

(75) Inventors: John A. Devos, Corvallis, OR (US); David C. Collins, Philomath, OR (US); Jeffrey A. Nielsen, Corvallis, OR (US); Terry M. Lambright, Corvallis, OR (US); Tony S. Cruz-Uribe, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 284 days.

(21) Appl. No.: 11/251,159

(22) Filed: Oct. 14, 2005

(65) Prior Publication Data

US 2007/0087071 A1    Apr. 19, 2007

(51) Int. Cl.
  *B28B 1/16* (2006.01)
(52) U.S. Cl. ............... 425/375; 264/401; 264/308; 700/118
(58) Field of Classification Search ............. 425/375; 264/308, 401; 700/118
See application file for complete search history.

(56) References Cited

U.S. PATENT DOCUMENTS

| | | | |
|---|---|---|---|
| 5,126,529 A | 6/1992 | Weiss et al. | |
| 5,398,193 A | 3/1995 | deAngelis | |
| 5,936,861 A | 8/1999 | Jang et al. | |
| 6,280,784 B1 | 8/2001 | Yang et al. | |
| 6,280,785 B1 | 8/2001 | Yang et al. | |
| 6,471,800 B2 | 10/2002 | Jang et al. | |
| 6,706,234 B2 | 3/2004 | Huang | |
| 6,934,600 B2 | 8/2005 | Jang et al. | |
| 2005/0225007 A1* | 10/2005 | Lai et al. | 264/308 |
| 2006/0099287 A1* | 5/2006 | Kim et al. | 425/174.4 |

* cited by examiner

*Primary Examiner*—Yogendra N. Gupta
*Assistant Examiner*—Maria Veronica Ewald

(57) ABSTRACT

Solid freeform fabrication systems, powder supply bins for solid freeform fabrication systems, and methods of solid freeform fabrication are disclosed. One exemplary solid freeform fabrication system includes a powder supply bin, a build bin, a roller, and a print head disposed above the build bin that deposits a binder onto the powder in the build bin in a preselected pattern, the supply bin and/or the build bin translating in a x- and/or y-direction relative to the print head.

20 Claims, 6 Drawing Sheets

SYSTEMS AND METHODS OF SOLID FREEFORM FABRICATION WITH TRANSLATING POWDER BINS

RELATED APPLICATIONS

This application is related to U.S. utility patent application Ser. No. 11/191,797, filed on Jul. 28, 2005 and U.S. utility patent application Ser. No. 11/229,886, filed on Sep. 19, 2005.

BACKGROUND

Conventional powder supply and build bins in solid freeform fabrication (SFF) systems include vertical walls attached to the working surface of the SFF machine and a permanent bottom plate that is height-controlled throughout the build process. The bottom plate of the powder-source bin increments upward during the build process to provide additional powder that can be spread above a build plate in the build bin. The build plate is simultaneously incremented downward to accept a new layer of build powder. Regardless of the size of the desired prototype, or build, a volume of powder to fill the entire build bin to the height of the parts being built is required. This can sometimes limit the ability of a user to produce parts with limited powder on-hand.

Current SFF systems have powder bins that are stationary in the x- and y-axes (when viewing the system from above). In current systems, the printing mechanism moves in both the x- and y-axes in order to deposit a binder and/or ink in the desired location on the build plate. In order to translate the printing mechanism, SFF systems have large servo and translation mechanisms, which can by heavy and take up more space than desired. As such, SFF systems have utilized printing mechanisms that are specially manufactured for such systems, rather than the types of printing mechanisms that are manufactured in high volume for convention inkjet printers.

It would be desirable to have a SFF system that is lighter, smaller, and easier to use, and would have less down-time for set up, powder dig-out, and powder change-out processes.

BRIEF DESCRIPTION OF THE DRAWINGS

Many aspects of this disclosure can be better understood with reference to the following drawings. The components in the drawings are not necessarily to scale. Moreover, in the drawings, like reference numerals designate corresponding, but not necessarily identical, parts throughout the several views.

DETAILED DESCRIPTION

The disclosed solid freeform fabrication (SFF) systems have incorporated therein a convenient supply powder and build bin packaging. The supply powder bin and/or build bin can include a removable top, four side walls, a piston-like bottom that supports the powder and allows a printer piston to feed powder to the spreader during the printing and object fabrication process, and features that easily locate/attach/register the bin with the SFF system. The disclosed bins can be either disposable or reusable and are configured to be interchangeable within the SFF system. The disclosed bins simplify the set-up process, as well as reduce the powder spillage and the required clean up associated with three-dimensional (3D) printing and selective laser sintering (SLS) processes.

Figure 1:
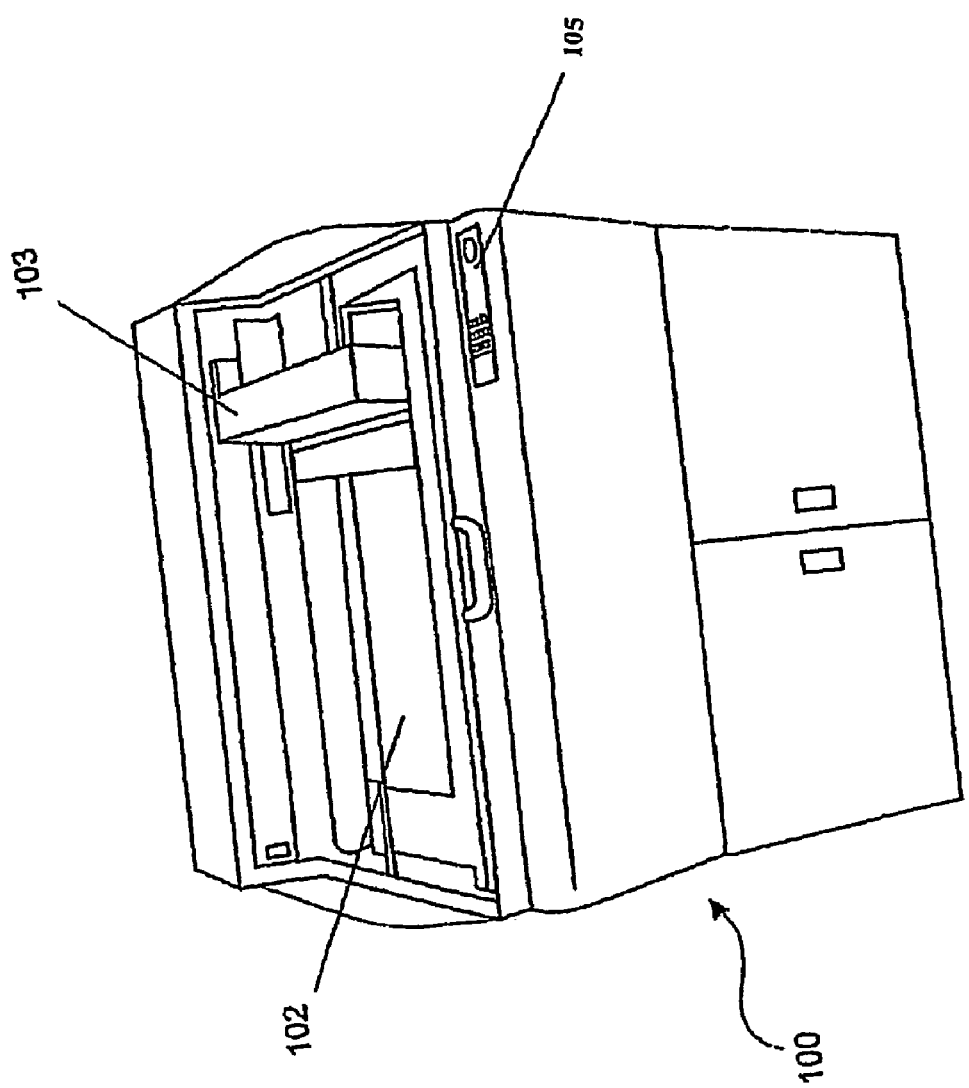
FIG. 1 illustrates a solid freeform fabrication system that uses a printing process to fabricate desired products. An embodiment of the present invention can be implemented in the system illustrated in FIG. 1.

Having thus generally described the disclosed SFF systems, reference will now be made to the figures. FIG. 1 illustrates one solid freeform fabrication system that uses 3D printing technology. The disclosed powder bins, apparatuses, and methods can also be applied to SLS systems.

In the SFF system 100 of FIG. 1, a powdery material (e.g., a plaster- or starch-based powder) is used to form each individual layer of the desired product. To do this, a measured quantity of powder is first provided from a removable supply chamber or bin in the solid freeform fabrication system 100. A powder spreading mechanism, such as a roller, preferably incorporated into a movable stage 103, then distributes and compresses the powder at the top of a fabrication chamber or removable build bin 102 to a desired thickness. Then, a print head (not shown) deposits an adhesive or binder onto the powder in the build bin 102 in a two dimensional pattern. This two dimensional pattern becomes a thin cross section of the desired product. The print head may also eject colored binder, toner, and/or color activator into the layer of powder to provide a desired color or color pattern for this particular cross section of the desired product. Although a print head is described with respect to FIG. 1 as an example, other binding apparatuses can be used, for example, a laser that sinters the powder.

The powder becomes bonded in the areas where the adhesive or binder is deposited, thereby forming a thin layer of the desired product. After each layer of the 3D object is fabricated, the build bin 102 (in which the object sits) is repositioned downward along the z-axis so that the next layer of the object can be formed on top of the previously formed layer. By way of example, the build bin 102 can have dimensions such as 8"×10"×10" or 6"×6"×6" to accommodate fabricators and 3D objects of various sizes.

The process is repeated with a new layer of powder being applied over the top of the previous layer in the build bin 102. The next cross section of the desired product is then printed with adhesive or binder into the new powder layer. The adhesive also serves to bind the adjacent or successive layers of the desired product together. A user interface or control panel 105 can be provided to allow the user to control the fabrication process.

This process continues until the entire object is formed within the powder bed in the build bin 102. The build bin 102 can be removed from the SFF system 100 so that the fabricated object can be removed from the build bin 102 outside of the SFF system 100. The extra powder that is not bonded by the adhesive is then brushed or vacuumed away leaving the base or "green" object.

The SFF system 100 also includes a controller (not shown) which is programmed to, among other things, control the positioning and repositioning of the print head 103 during the 3D object fabrication process. The controller can take the form of a discrete module positioned proximate to the print head; alternatively, the operations performed by the controller can be distributed among a plurality of controllers, processors or the like, and/or the controller can be remotely located relative to the print head.

Such a printing process offers the advantages of speedy fabrication and low materials cost. It is considered one of the fastest solid freeform fabrication methods, and can be performed using a variety of colors.

The print head in the SFF system 100 can include inkjet technology for ejecting a binder or adhesive on a powder layer to form the layers of the desired object. In inkjet technology, the print head ejects drops of binder in a selective pattern to create the image being printed, or in the case of solid freeform fabrication, to color the object being fabricated. As used herein and in the attached claims, the term "binder" is used broadly to mean any substance ejected by a print head to form an object being fabricated. Consequently, the term "binder" includes, but is not limited to, binders, adhesives, etc. The binder can be, for example, clear (to create non-colored parts) or colored (to create colored objects or parts of objects).

Figure 2:
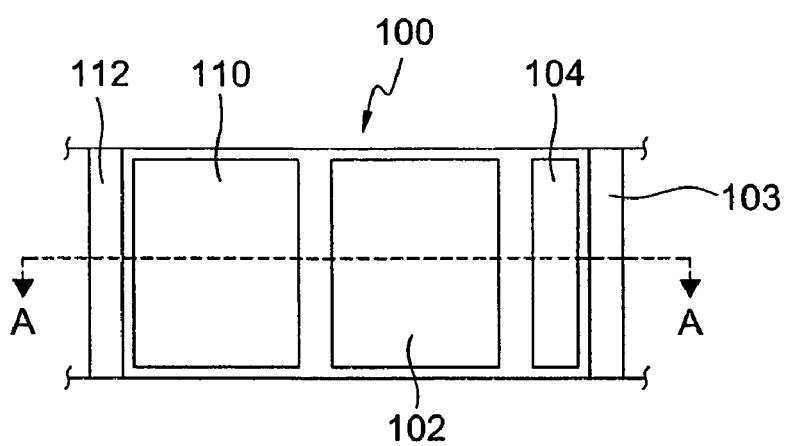
FIG. 2 illustrates a partial top view of the solid freeform fabrication system of FIG. 1, showing an exemplary supply or build bin.

FIG. 2 illustrates a partial top view of the SFF system 100 of FIG. 1, showing an exemplary supply bin 110 and a build bin 102 adjacent the supply bin 110. The roller 112 traverses the supply bin 110, and moves a very thin layer of powder from the top surface of the supply bin 110 onto a platform of the build bin 102. Thereafter, the print head 103 deposits the binder onto the powder layer on the platform of the build bin 102, thereby forming one layer of the desired object.

Shown in the embodiment of FIG. 2, on the opposite side of the build bin 102 from the supply bin 110 is a shallow catch bin 104. Other embodiments, however, may not require the catch bin 104. The shallow catch bin 104 can catch small amounts of excess powder that is a natural part of the spreading process. This can allow for easier segregation of different powder types. In some embodiments, the catch bin 104 can be of a different size and in a different location than that shown in FIG. 2, based on how powder is provided to the catch bin 104, and where handles are located on the catch bins for removing them. In embodiments that do not include the shallow catch bin 104, the excess powder can be captured in a larger default catch bin (not shown) disposed on the side of the build bin 102 opposite the powder supply bin 110.

The supply bin 110, the build bin 102, and/or the catch bin(s) 104 are designed to be easily removable from the system 100. The supply bin 110 and/or the build bin 102 can thus be reused for another fabrication or disposed of.

Figure 3:
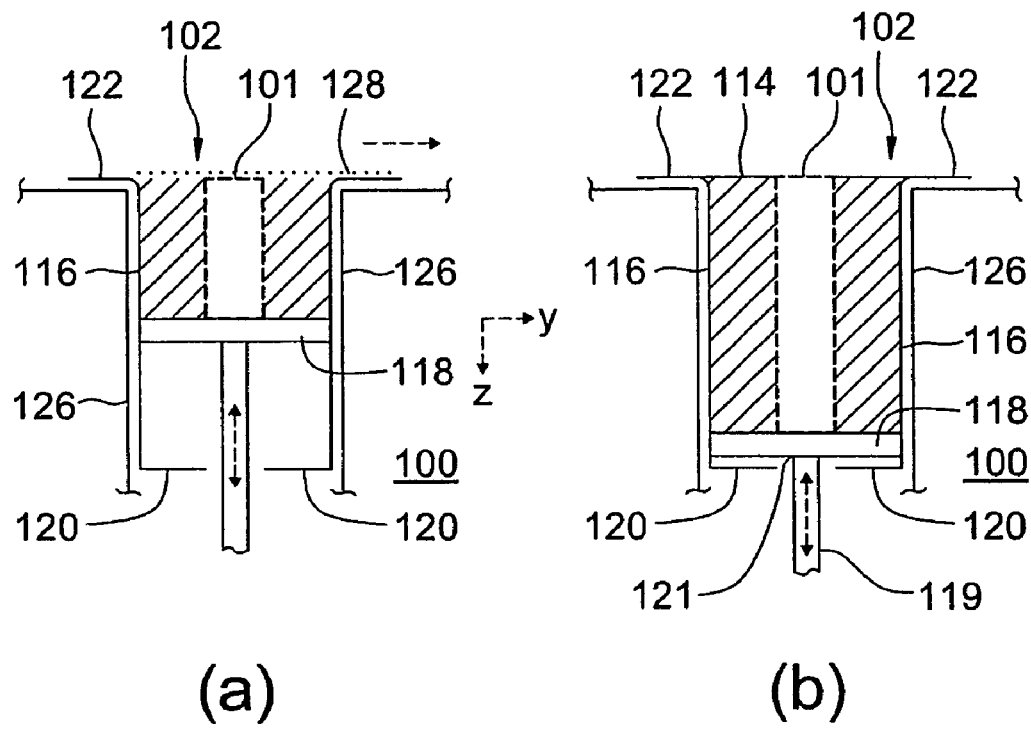
FIG. 3 illustrates a cross sectional view of an embodiment of the supply or build bin taken along section line A-A in FIG. 2.

FIG. 3 illustrates a partial cross section of an embodiment of the disclosed SFF system 100, taken along section line A-A in FIG. 2. FIG. 3 shows the exemplary build bin 102 (a) during fabrication of an object 101, and (b) after fabrication of the object 101, while the object 101 is seated in a bed of powder 128 in the build bin 102. The embodiment of the build bin 102 depicted in FIG. 3 includes a removable lid 114, rigid boundaries or side walls 116 (e.g., four side walls for a square or rectangular bin), and a bottom moveable platform 118 that can be operated in the z-direction by a linear motion actuator 119 already in place in the solid freeform fabrication system 100.

The build bin 102 can also have a quick-release interface 121 that interacts with a linear motion actuator 119 such that the actuator 119 can engage the bottom moveable platform 118. The quick-release interface 121 can be, for example, a latch, a magnet, or other device(s) that would allow the actuator 119 to easily engage and then release the platform 118. In some embodiments, the build bin 102 may not include the quick-release interface 121. Although the actuator 119 is depicted in FIG. 3 as a piston cylinder, it could instead be, for example, linear motors, lead screws, servo motors, hydraulic pistons, air-driven pistons, etc.

As shown in FIG. 3(a), when the build bin 102 is placed into the system 100, the side walls 116 fit into and lock in place within a build bin housing 126. The build bin housing 126 can have, for example, grooves that can accommodate matching protrusions on the build bin 102 (not shown), or simple mechanical latches. The build bin 102 (or supply bin 110) can have one or more mechanical interfaces between the bin and the SFF system 100 that locate the bin in the desired location (x-, y-, and z-planes). The interfaces can be, for example, one or more flanges, a slidable mechanism (in y- or z-direction), or one or more dowels that protrude from a side of the bin housing. In one embodiment, the bin(s) drop into the system in the z-direction, and have interfaces that hold and locate it approximately flush with the working surface of the system 100. In the embodiment shown in FIGS. 3 and 4 the bins have a pair of upper flanges 122 that extend beyond the side walls of the bin in the y-direction, and engage at least one upper working surface 124 in the system 100. The upper flanges 122 engage an upper surface 124 of the bin housing 126 and aid in placement of the build bin 102 and/or maintaining the build bin 102 in place during operation of the system 100. In place of the flanges 122, one embodiment of the build bin 102 can have mechanical latches or magnets to ensure that only the powder is lifted by the actuator 119, and not the entire bin 102 itself. Positive downward force can be applied by cam action or springs in the latches.

Alternatively, or in addition, the build bin 102 can include vertical registration components such vertical pins with hardened points on the tips, located in the system 100, that contact either the bottom surface 118 or the flanges 122 or lip around the bin 102. Use of registration components minimizes the possibility of powder interfering with the registration interface. Further, the bin 102 can include one or more seating sensors (not shown) to detect when the bin 102 is properly seated in the system 100. Seating sensor(s) can be, for example, an electrical continuity check, a Hall effect sensor, a through-beam or reflected light sensor, and/or a high precision switch. In addition, the seating sensor can also include mechanical or electrical lockout features to ensure use of materials that are compatible with the SFF system.

In one embodiment, the linear motion actuator 119 pulls downward on the bottom moveable platform 118, which fits exactly inside the side walls 116 of the build powder bin 102. In one embodiment, the build bin 102 includes a pair of lower flanges 120 that extend beneath and parallel to the bottom moveable platform 118, on which the platform 118 rests when the build bin 102 is full of powder and the fabricated part(s), as shown in FIG. 3(b).

As depicted in FIG. 3(a), the lid 114 is removed, thereby exposing the next layer of powder 128 for fabrication. The actuator 119 acts on the platform 118 to pull the platform 118 downward in the z-direction. A thin layer of powder 128 is deposited, the excess of which can be rolled forward in the y-direction toward a catch bin (not shown) by the roller 112, exposing one thin layer of powder 128 for each layer of the device or object fabrication.

The removable lid 114 can be, for example, a lid that peels back, or even completely off, slides on or off, or that snaps onto and off of a lip (not shown) of an upper surface of the build bin 102. The lid can also be designed, as in a snap-fit lid, to be re-installed after fabrication of an object so that the build bin 102, when full of powder and the fabricated object, can be removed from the system 100 with minimal risk of spilling the powder and/or creating airborne powder migration. The lid can be opened and/or removed either manually or by components in the SFF system 100. Although the embodiment of the build bin 102 depicted in FIG. 3 includes a removable lid 114, in some embodiments the build bin 102 may not include the lid 114.

The material of the build bin 102 can be any material that is sufficiently rigid to support a bin full of powder or slurry. For example, the material can be a metal or metal alloy, cellulosic material, or hard, stiff plastic (e.g., thermosets and thermoplastics, including for example, acetals, acrylics, terpolymers, alkyds, melamines, phenolic resins, polyarylates, polycarbonates, high density polyethylene, polyphenylene sulfide, polystyrene, polyvinyl chloride, styrene acrylonitrile, polyphenylsulfone, sulfones, unsaturated polyesters, polypropylene, polytetrafluoroethylene, polyethersulfone, polyetherketone, liquid crystalline polymers, or urea-formaldehyde molding compounds, etc.). The material of the build bin 102 can also include fillers for the polymers, the fillers being designed to be compatible with each polymer. The fillers can impart various properties to the polymeric material, such as increased strength. The build bin 102 can be designed to be either disposable or reusable, depending on the material selected for the build bin 102. In addition, in one embodiment, the build bin 102 includes low friction surfaces on side walls 116, whereby powder contained in the build bin 102 slides easily along the bin walls throughout the fabrication process.

Figure 4:
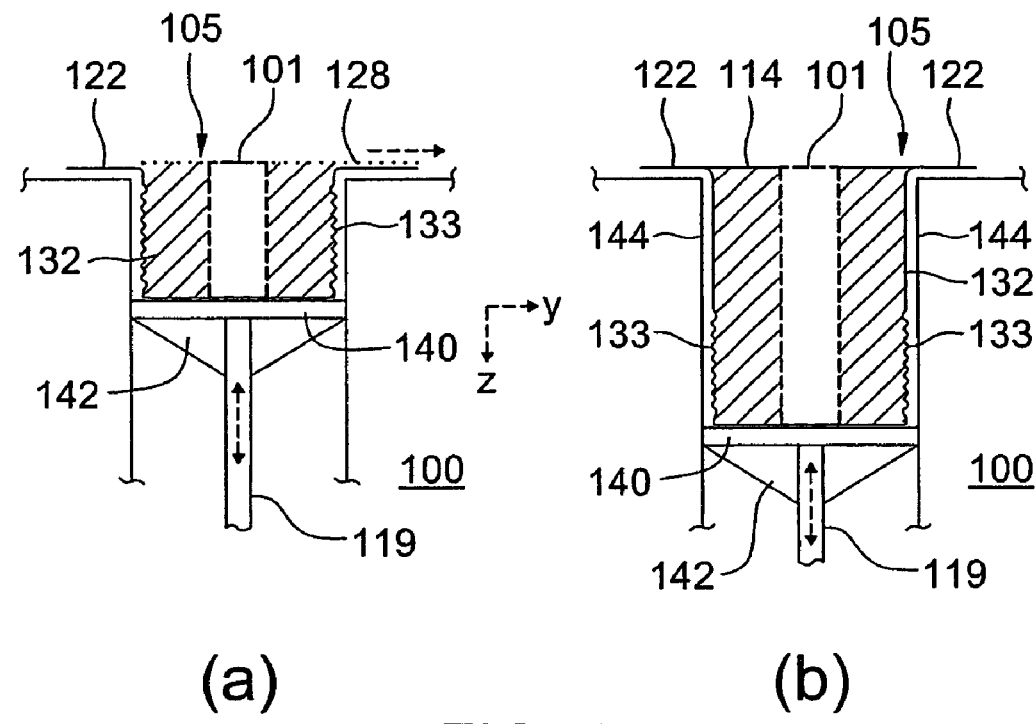
FIG. 4 illustrates a cross sectional view of an embodiment of the supply or build bin taken along section line A-A in FIG. 2.

FIG. 4 illustrates a cross sectional view of an embodiment of the build bin 105 taken along section line A-A in FIG. 2, the build bin 105 being a bag-like material. FIG. 4 shows the exemplary build bin 105 (a) during fabrication of the object 101, and (b) after fabrication of the object 101, while the object 101 is seated in a bed of powder 128 in the build bin 105. The build bin 105 includes a removable lid 114, a bag compartment 132, and a pair of upper flanges 122 that extend from an upper surface of the bin 105.

The bag compartment 132 depicted in FIG. 4 includes a crinkle zone 133 that enables the bag to fold easily as a platform 140 and the actuator 119 operate on the bag compartment 132 in the z-direction. In the embodiments employing a bag compartment 132, the space/clearance between the bag compartment 132 and side walls in a build bin housing 144 is large enough to accommodate collapsed folds of the bag compartment 132. Although the bag compartment 132 depicted in FIG. 4 includes a crinkle zone 133, other embodiments may not include the crinkle zone 133.

The platform 140 and actuator 119 can be already in place in the system 100, and the build bin 105 is inserted to rest on top of the platform 140. The actuator 119 in one embodiment can have struts 142 to stabilize the actuator 119 during movement. The struts 142 can be, for example, a stiff metal, metal alloy, or a hard plastic material. In other embodiments, the actuator 119 may not have struts 142.

The build bin 105 can have a pair of upper flanges 122 that extend beyond the side walls. The upper flanges 122 engage an upper surface 124 of the bin housing 126 and aid in placement of the build bin 105. Preferably, the upper flanges 122 are of a stiffer material than the bag compartment 132 in order to aid in proper placement of the bag compartment 132. The upper flanges can be made of, for example, a cellulose-based material (e.g., cardboard), a metal, or a hard plastic.

In one embodiment, the linear motion actuator 119 pulls downward on the platform 140, which fits exactly inside the side walls of the build bin housing 144 in the system 100. As depicted in FIG. 4(a), the lid 114 is removed, thereby depositing the powder. The actuator 119 acts on the platform 140 to pull the platform 140 downward, in the z-direction. As the platform 140 moves downward, the bag compartment 132 unfolds and is pulled downward by gravity. A thin layer of powder 128 is exposed, the excess of which can be rolled forward in the y-direction toward a catch bin (not shown) by the roller 112 (see FIG. 2), exposing one thin layer of powder 128 for each layer of the device fabrication.

The removable lid 114 can be, for example, a lid that peels back or even completely off, or that snaps onto and off of a lip (not shown) of an upper surface of the build bin 105. The material of the bag compartment 132 can be any material that is sufficiently rigid to support a bin full of powder or slurry, yet sufficiently pliable to unfold upon expansion caused by the lowering of the actuator 119 and platform 140. The bag compartment is chosen to provide a barrier to environmental conditions such as, for example, air, humidity, moisture, grease, and/or light, etc. For example, the material of the bag compartment 132 can be any flexible polymeric material. These include but are not limited to flexible films of polyvinyl chloride, polyvinylidene, polyethylene, polyethylene copolymers, polyethylene naphthalate, polyester, polyamide, polyarylates, polybutylene terepthalate, polypropylene, polyurethane, cellulosics, and polysaccharides. The build bin 105 can be designed to be either disposable or reusable, depending on the material selected for the build bin 105. By using a bag compartment 132 for the build bin 105, the tolerance between the platform 140 and the side walls of the bin housing 144 can be reduced, as well as eliminating the need for o-rings that are typically used to create a tight seal.

By using a removable build bin, unused powder that is contained in the build bin can be easily removed from bin while the bin is outside of the solid freeform fabrication system. The build bin can be reused at a later time, for example as a supply bin 110 (once the fabricated object has been removed), or the powder recycled from the build bin for other uses. Thus, in one embodiment of the system 100, the supply bin 110 and the build bin are configured to be interchangeable. For example, the supply and build bins can both be removable, and be of the same size and shape to allow each one to fit into a housing for the other one.

Figure 5:
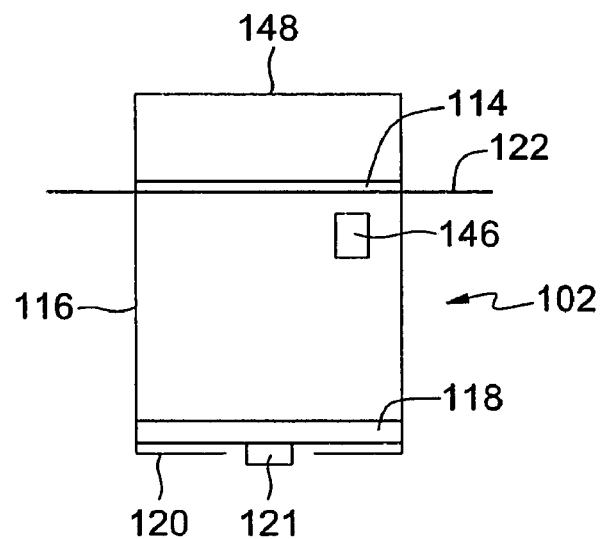
FIG. 5 illustrates a side view of an embodiment of the disclosed supply or build bin.

In addition, as illustrated by FIG. 5, the build bin 102 can include a memory mechanism 146 that can communicate information to the controller about the supply bin, such as, for example, powder volume, powder type, bin manufacturer (e.g., to help determine if the supply bin is a genuine supply bin), allowable binder types for the powder, recommended spread-roller rotation speed, supply bin z-step size, expiration date of the powder, drop volume needed for a given layer thickness, setting time, etc. The memory mechanism 146 can be, for example, an integrated circuit (IC) chip, a tag or label with a bar code, and/or a mechanical device that conveys information about the powder level and/or the bin. An example of a mechanical device used as the memory mechanism 146 includes "break tabs," where certain tabs indicate a particular bin size and/or powder type. The SFF system 100 can be configured to determine which tabs are present upon insertion via sensors, switches, or other means. In addition, information about powder volume can be conveyed where the memory mechanism 146 includes a "gas gauge" type of device that tracks and conveys information about the remaining volume of powder after some usage.

The solid freeform fabrication system 100 can include a sensor that is capable of reading the memory mechanism 146. For example, in the case of an IC chip, the system 100 can use information from the build bin in tandem with the information from the inkjet supply's memory chip to ensure, for example, that the correct binder liquid and powder are mixed. The system 100 can also use the data encoded in or on the memory mechanism 146 to determine certain operating parameters, such as for example, print speed, drop volume per voxel, color maps, dry time needed after build completion, shrink or expansion size, adjustment factors, powder settling coefficients (e.g., to determine whether powder supports need to be included, and if so, how much support), minimum allowable layer thickness, etc.

Communication with the IC can be via contact pads or wireless via radio frequency signals. Generally the bar codes are read only, whereas the IC can be written to. The memory mechanism 146 can be placed anywhere on the build bin, so long as a sensor in or on the SFF system 100 can read it.

The build bin 102 can include a handle 148. The handle 148 can be in any configuration (e.g., square or semicircular) and can be removable, collapsible, telescoping, and/or magnetic. In addition, the handle can be a notch or set of notches, inset into the build bin 102 or 105. The build bin is designed so that it can be removed from the system 100 by grasping and pulling on the handle 148, or inserting a removable handle into the features provided.

Figure 6:
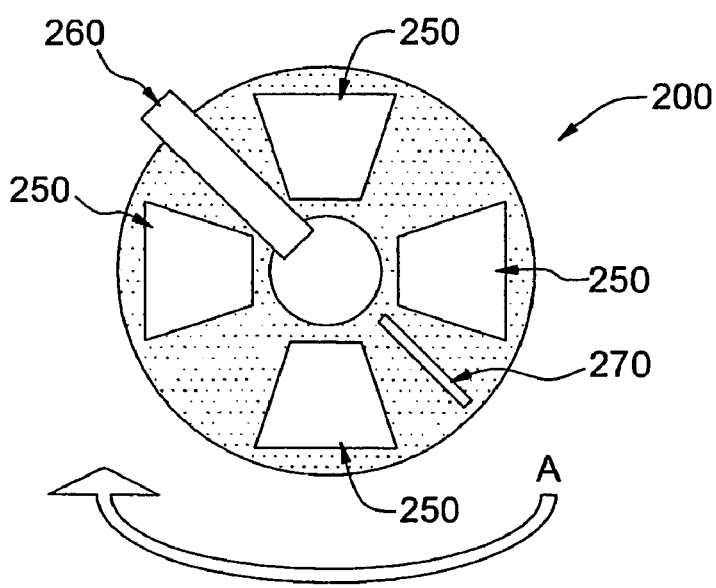
FIG. 6 illustrates a top view of an embodiment of a continuous printing platform used in the system of FIG. 1.

FIG. 6 illustrates a top view of an embodiment of a continuous printing platform 200 that can be used in the system 100 of FIG. 1. Multiple removable bins 250 are disposed in the substantially circular printing platform 200. The bins 250 are interchangeable powder supply bins or build bins. Disposed over the bins 250 is a print bar/powder spreader 260. The print head can be disposed on the same print bar/powder spreader 260 as the powder spreader, as shown in FIG. 6, or can be disposed on a separate mechanism (not shown). Additionally, in the embodiment depicted in FIG. 6 the printing platform includes an extra powder chute 270. Other embodiments may not include the powder chute 270. The chute 270 in one embodiment is disposed between two of the removable bins 250. As depicted by arrow A, the printing platform 200 rotates in a clockwise direction in one embodiment. In another embodiment, the printing platform rotates in a counter-clockwise direction. In this manner, the printbar/powder spreader 260 spreads the powder from a first bin 250 onto a build platform of a second bin 250. The printbar/powder spreader 260 then ejects binder onto the powder on the layer of powder platform, thus fabricating at least one layer of an object. The configuration of the printing platform 200 depicted in FIG. 6 allows multiple build bins to be printed at once, and also allows a continuous process.

In the embodiment shown in FIG. 6, not every bin would have to have a part or object completely fabricated before the fabricated objects in a different bin could be removed. By temporarily stopping the fabrication process, the bins with the fabricated object can be removed and replaced with a new empty bin in which a new object can subsequently be fabricated. The embodiment of the printing platform 200 depicted in FIG. 6 increases the utilization of the print head during the printing process and increases utilization of the SFF system 100 by not necessitating that every part within the multiple bins 250 be completed at one time. In one embodiment, the printing platform 200 is fixed and the printbar/powder spreader 260 rotates over the bins.

In other embodiments of the system 100, the bins include features that allow attachment to other pieces of the system 100 for further processing. For example, the bins can include features for attachment to other equipment such as, for example, a dryer, a de-powdering station, a powder refill station, a powder packaging station (for either reusable powder or for packing fresh containers after shipping), etc.

Figure 7:
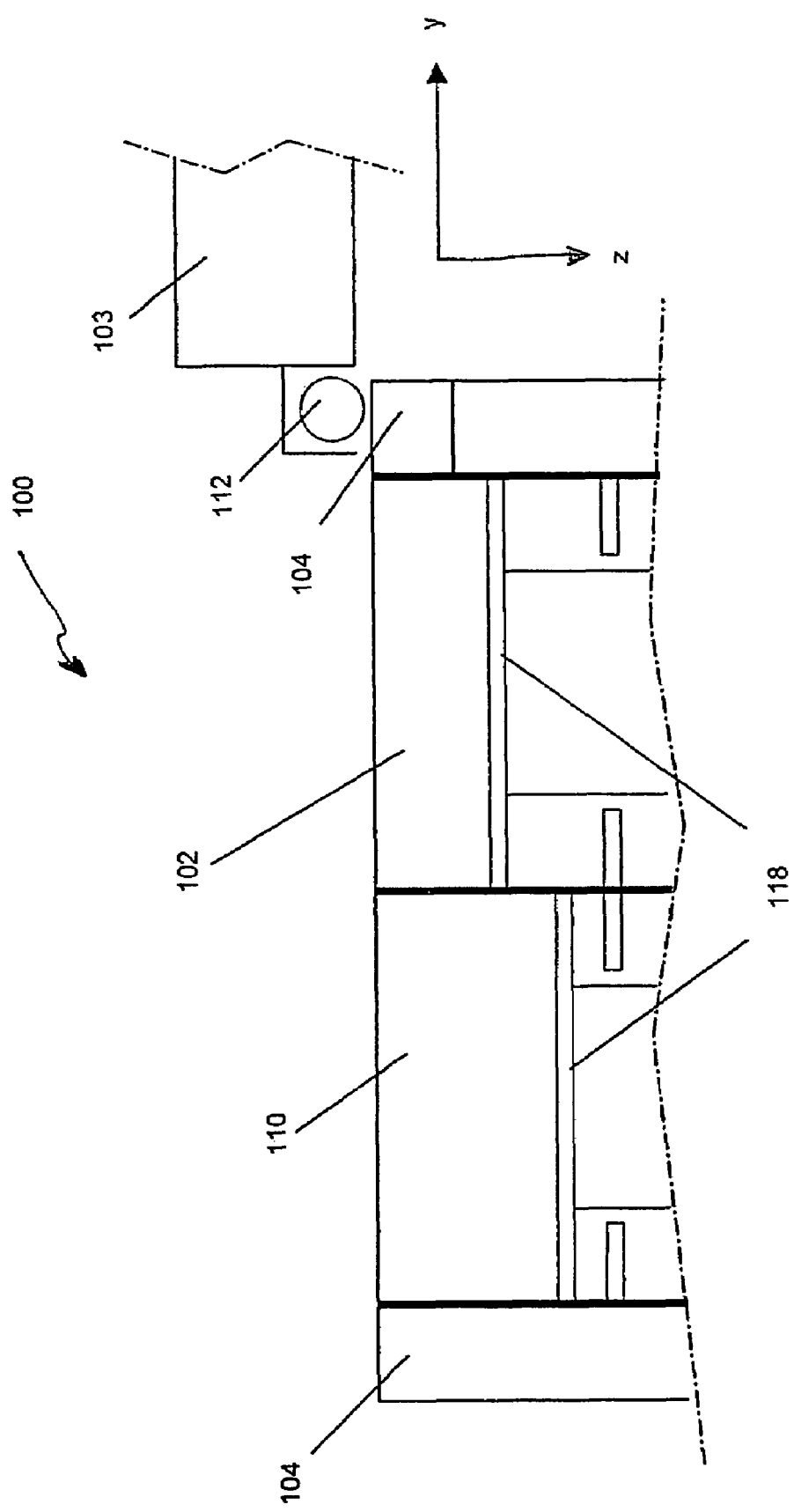
FIG. 7 illustrates a cutaway side view of an embodiment of a SFF system of FIG. 1.

Also disclosed are SFF systems that include translating powder bins. The powder supply bin and/or the build bin can move along x- and/or y-axes relative to the print head. For example, referring to FIG. 7, the target surfaces of the powder supply bin 110 and the build bin 102 of the SFF system 100 are located in close, working proximity to (e.g., at a predetermined initial distance from) the print head 103. The target surface of the build bin 102 can have a flat region sufficiently large to accommodate the layers of powder from the supply bin 110 that are deposited thereon by the roller 112.

The print head 103 and one or both of the supply bin 110 and the build bin 102 are equipped with mechanical drive mechanisms. The mechanical drive mechanisms can translate the bin(s) relative to the movable dispensing head in three dimensions along x- an y-axes in a predetermined sequence and pattern, and/or displace the print head 103 a predetermined incremental distance relative to the bin(s). This can be accomplished, for instance, by allowing the bin(s) and the print head 103 to be driven by one, two, or three separate linear motion devices, which are powered by, for example, one, two, or three separate servo motors. Linear motion devices and x-, y-, z-gantry tables are commercially available. In most embodiments, the powder bin platforms move in the z-axis direction. However, also included are embodiments in which the entire bin(s) can move in the z-axis, for example, to provide additional clearance for roller translation or powder to pen spacing if needed for a particular step, such as UV curing. In addition, in some embodiments, the pens of the print head can move in the z-axis. For example, the pens can translate in the z-direction to allow for servicing a part or parts of the system 100.

Although in most embodiments only the powder bin platforms move in the z-axis, z-axis movements can also be effected to displace a nozzle of the print head 103 relative to the build bin 102 and, hence, relative to each layer deposited prior to the start of the formation of each successive layer. This will make it possible to form multiple layers of predetermined thicknesses, which build up on each other sequentially as the material composition solidifies after being discharged from an orifice in the nozzle. X- and y-axis movements are effected to fabricate a device of a desired size and shape.

Instead of servo motors, many other types of driving mechanism can be used, including for example, linear motors, stepper motors, synchronous motors, D.C. motors, and fluid motors. It will be understood that movement in the x-y plane need not be limited to movement in orthogonal directions, but may include movement in radial, tangential, arcuate, and other directions in the x-y plane. By allowing one or more bins to move relative to the print head, smaller driving and translation mechanisms can by used, which in turn can reduce the overall size, weight, and cost of a SFF system. In addition, print heads employed in conventional inkjet printers that are manufactured in high volumes can be used in embodiments of the disclosed SFF in which one or both of the bins can translate relative to the print heads.

Referring again to FIG. 7, in one embodiment of the disclosed system 100, both the powder supply bin 110 and the build bin 102 are attached to a single stage and translate relative to the print heads 103 in the y-axis. The print head 103 translates in the x-axis by, for example, a belt drive mechanism. In one embodiment, the roller 112 is can spin, with its longitudinal axis remaining fixed in place. For other embodiments with either fixed bins or moving bins, the roller axis can be moved relative to, and/or independent the translation of, the powder bins. For example, in one embodiment moving the roller at least partway and the bins partway can save on the overall space used for bin translation.

Figure 8:
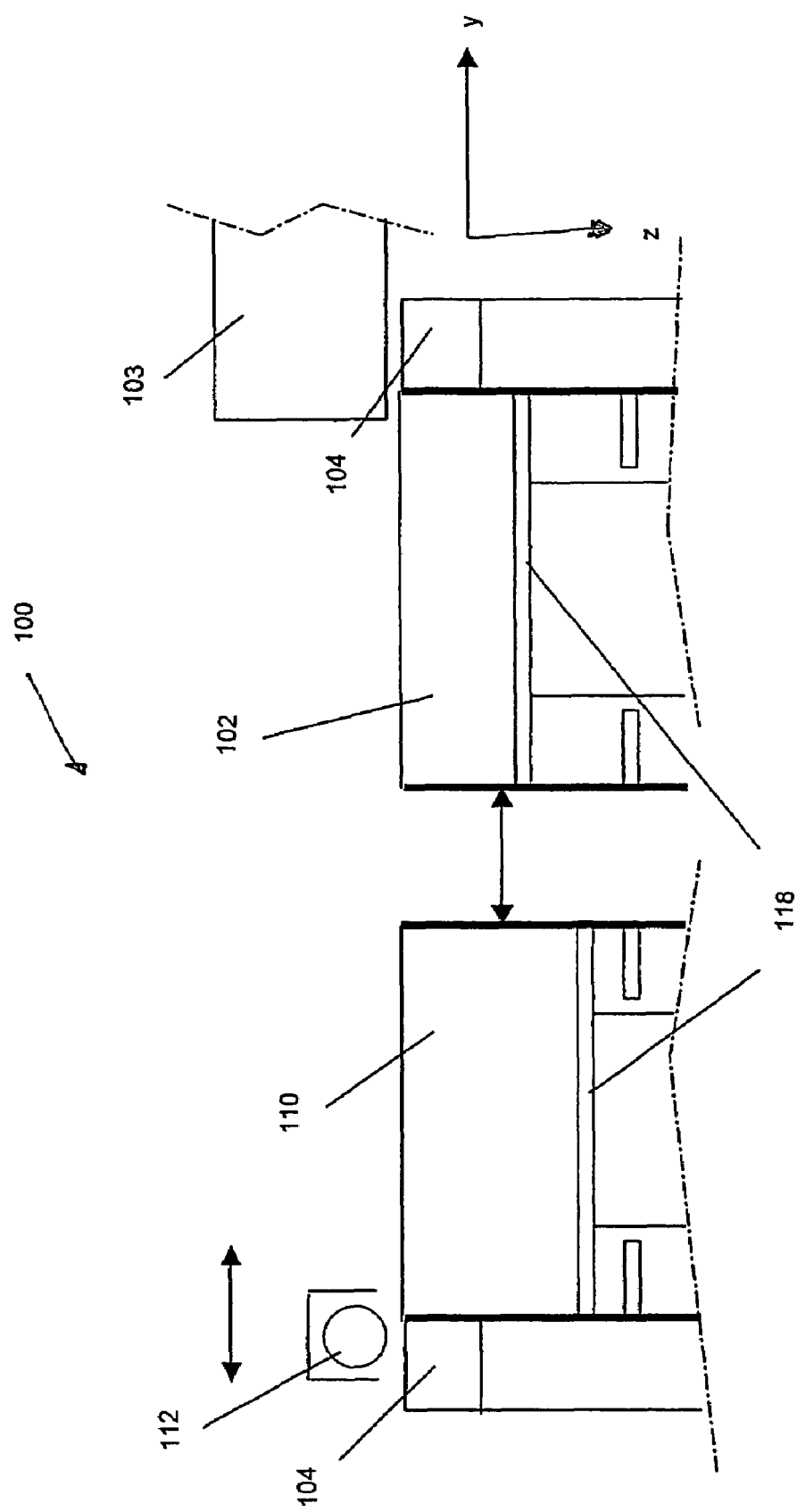
FIG. 8 illustrates a cutaway side view of an embodiment of a SFF system of FIG. 1.

Referring to FIG. 8, in one embodiment of the disclosed system 100, the powder supply bin 110 and the build bin 102 are on separate stages. The supply bin 110 is stationary, with the build bin 102 translating in the x- and/or y-axis. In one embodiment, the roller 112, also, translates in the y-axis.

Figure 9:
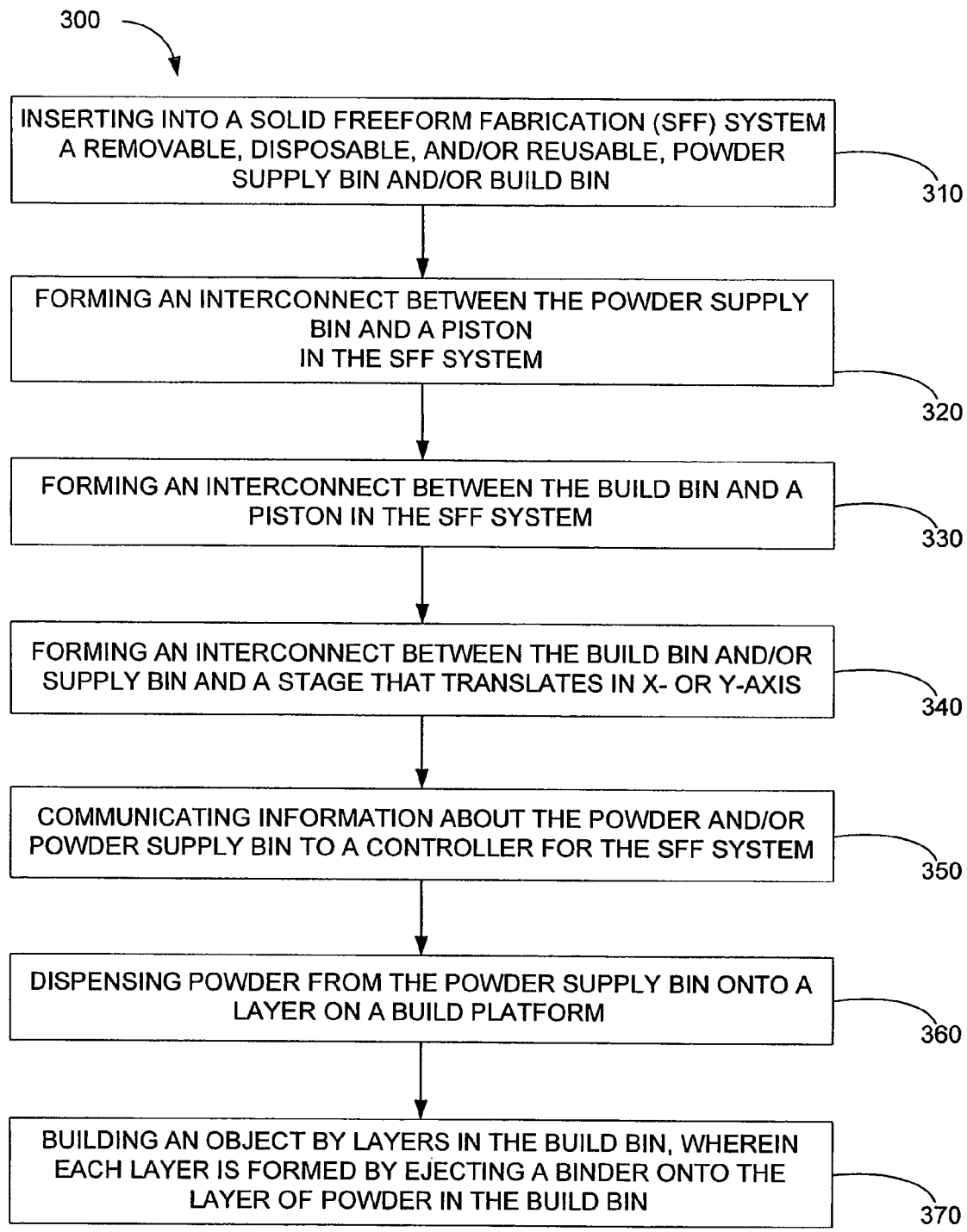
FIG. 9 is a flow diagram illustrating an embodiment of a disclosed method of solid freeform fabrication.

Also disclosed are methods of solid freeform fabrication, using the disclosed build bins. FIG. 9 is a flow diagram describing a representative method 300 for forming a three-dimensional object, using the solid freeform fabrication system 100. In block 310, removable, disposable, and/or reusable powder supply and build bins are inserted into a solid freeform fabrication system. In block 320, an interconnect is formed between the powder supply bin and a piston cylinder in the solid freeform fabrication system. In some embodiments of the method, gravity alone is sufficient to provide an interconnection between the bin(s) and the piston and the powder supply bin does not include an interconnect and the step depicted in block 320 is not performed.

Similarly, as shown in block 330, an interconnect is formed between the build bin and a piston in the SFF system 100. As illustrated in block 340, an interconnect is also formed between the build bin or both the supply bin and the build bin to a stage that translates in x- and/or y-axis relative to a printing mechanism in the SFF system. In some embodiments of the method, gravity alone is sufficient to provide an interconnection between the bin(s) and the piston and the build bin and/or stage does not include an interconnect and the step depicted in block 330 is not performed.

Then, as shown in block 350, information can be communicated from the powder supply bin to a controller for the solid freeform fabrication system. Powder is then dispensed from the powder bin onto a build platform, as shown in block 360. In some embodiments of the method 300, information may not be communicated from the powder supply bin to the controller, and the step depicted in block 360 is not performed.

Block 370 shows how an object is built in a build bin, by ejecting a binder from, for example, an inkjet print head, onto the layer of powder on the build platform, thereby forming layers of the object. Where reasonable, the steps of the disclosed methods can be performed out of order from the sequence(s) discussed herein. For example, but without limitation, the steps depicted in blocks 320 and 330 can be performed in reverse order and/or simultaneously.

Many variations and modifications may be made to the above-described embodiments. All such modifications and variations are intended to be included herein within the scope of this disclosure and protected by the following claims.

The invention claimed is:

1. A solid freeform fabrication (SFF) system comprising:
a powder supply bin;
a build bin adjacent the powder supply bin;
a printhead disposed above the build bin that deposits a binder onto the powder in the build bin in a preselected pattern;
a roller disposed adjacent the printhead, the roller configured to distribute and compress the powder at a top surface of the removable powder supply bin and the build bin to a desired thickness; and
wherein the powder supply bin and the build bin are attached to a stage that translates the powder supply bin and the build bin in a y-axis relative to the printhead.

2. The SFF system of claim 1, wherein the stage comprises a mechanical drive.

3. The SFF system of claim 1, wherein the stage comprises a mechanical drive that is selected from the group consisting of: a servo motor, a linear motor, a stepper motor, a synchronous motor, a D.C. motor, and a fluid motor.

4. The SFF system of claim 1, wherein the print head translates in an x-axis relative to the bins.

5. The SFF system of claim 1, wherein the print head translates in an x-axis relative to the bins via a belt drive.

6. The SFF system of claim 1, wherein each of the powder supply bin and the build bin comprises:
side walls made of a material chosen from one of the group consisting of: acetals, acrylics, terpolymers, alkyds, melamines, phenolic resins, polyarylates, polycarbonates, polyethylene, polypropylene, polyphenylene sulfide, polystyrene, polyvinyl chloride, styrene acrylonitrile, polyphenylsulfone, polyethersulfones, polyetherketones, unsaturated polyesters, polytetrafluoroethylene, liquid crystalline polymer, polyurethanes, urea-formaldehyde molding compounds, a metal, a metal alloy, and combinations thereof; and
a piston bottom configured to be acted on by a linear motion actuator of the SFF system.

7. The SFF system of claim 1, wherein each of the powder supply bin and the build bin comprises a bag compartment constructed of a flexible polymeric material.

8. The SFF system of claim 1, wherein each of the powder supply bin and the build bin comprises a bag compartment, the bag compartment being constructed of a polymeric film of one of the group consisting of: polyvinyl chloride, polyethylene, polyethylene copolymers, polyethylene naphthalate, polyamide, polyester, polyarylates, polybutylene terepthalate, polypropylene, polyurethane, cellulosics, and polysaccharides.

9. The SFF system of claim 1,
wherein at least one of the build bin or the powder supply bin comprises a memory that communicates information about the powder to a controller for the solid freeform fabrication system, and
wherein the system comprises a sensor that is configured to receive information from the memory on the powder supply bin.

10. A solid freeform fabrication (SFF) system comprising:
a stationary powder supply bin;
a build bin adjacent the powder supply bin, wherein the build bin comprises a moveable surface in the z-direction, on which an object is fabricated;
a roller disposed above the powder supply bin and the build bin, the roller being incorporated into a movable stage and configured to distribute and compress the powder at a top surface of the stationary powder supply bin and the build bin to a desired thickness; and a print head disposed above the build bin that deposits a binder onto the powder in the build bin in a preselected pattern;

wherein the build bin is configured to translate in a y-axis relative to the print head.

11. The SFF system of claim 10, wherein the stage comprises a mechanical drive.

12. The SFF system of claim 10, wherein the stage comprises a mechanical drive that is selected from the group consisting of: a servo motor, a linear motor, a stepper motor, a synchronous motor, a D.C. motor, and a fluid motor.

13. The SFF system of claim 10, wherein the print head translates in an x-axis relative to the bins.

14. The SFF system of claim 10, wherein the print head translates in an x-axis relative to the bins via a belt drive.

15. The SEE system of claim 10, wherein the build bin further comprises a memory that communicates information about the powder to a controller for the solid freeform fabrication system, wherein the information is one of the group consisting of: powder volume, powder type, bin manufacturer, allowable binder types for the powder, recommended spread-roller rotation speed, supply bin z-step size, expiration date of the powder, drop volume needed for a given layer thickness, and setting time.

16. The SEE system of claim 10, wherein the movable stage incorporating the roller translates independently of the build bin.

17. The SFF system of claim 10, wherein the movable stage incorporating the roller is static.

18. A solid freeform fabrication system comprising:

means for dispensing powder from a powder supply bin onto a layer on a build platform;

means for building an object by layers in the build bin, wherein each layer is formed by ejecting a binder with an inkjet print head onto the layer of powder in the build bin;

means for translating the build platform in a downward z-direction as the object is built;

means for translating the build platform a y-direction relative to the print head; and means for translating the print head in an x-direction relative to the build platform.

19. The system of claim 18, further comprising:

means for containing the powder in the powder bin;

means for pushing the powder upward in the supply bin; and means for allowing the powder to build in layers in the build bin.

20. The system of claim 18, further comprising:

means for communicating information about the powder to a means for controlling the system; and means for receiving information from the sensor on the powder supply bin.

* * * * *

UNITED STATES PATENT AND TRADEMARK OFFICE
CERTIFICATE OF CORRECTION

| | | |
|---|---|---|
| PATENT NO. | : 7,296,990 B2 | Page 1 of 1 |
| APPLICATION NO. | : 11/251159 | |
| DATED | : November 20, 2007 | |
| INVENTOR(S) | : John A. Devos et al. | |

It is certified that error appears in the above-identified patent and that said Letters Patent is hereby corrected as shown below:

In column 11, line 19, in Claim 15, delete "SEE" and insert -- SFF --, therefor.

In column 11, line 28, in Claim 16, delete "SEE" and insert -- SFF --, therefor.

Signed and Sealed this

Twenty-seventh Day of May, 2008

JON W. DUDAS
*Director of the United States Patent and Trademark Office*